US009036543B2

(12) United States Patent
Kishiyama et al.

(10) Patent No.: US 9,036,543 B2
(45) Date of Patent: May 19, 2015

(54) MOBILE TERMINAL APPARATUS AND RADIO BASE STATION APPARATUS WHEN CARRIER AGGREGATION AGGREGATING MULTIPLE COMPONENT CARRIERS IS PERFORMED

(75) Inventors: Yoshihisa Kishiyama, Kanagawa (JP); Motohiro Tanno, Kanagawa (JP); Mamoru Sawahashi, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 290 days.

(21) Appl. No.: 13/119,862

(22) PCT Filed: Sep. 18, 2009

(86) PCT No.: PCT/JP2009/066340
§ 371 (c)(1),
(2), (4) Date: Jun. 23, 2011

(87) PCT Pub. No.: WO2010/032811
PCT Pub. Date: Mar. 25, 2010

(65) Prior Publication Data
US 2011/0255469 A1    Oct. 20, 2011

(30) Foreign Application Priority Data
Sep. 22, 2008 (JP) .................................. 2008-242848

(51) Int. Cl.
*H04L 5/00* (2006.01)
*H04W 72/08* (2009.01)
*H04W 72/04* (2009.01)

(52) U.S. Cl.
CPC ............. *H04L 5/0005* (2013.01); *H04L 5/001* (2013.01); *H04L 5/0037* (2013.01); *H04L 5/0053* (2013.01); *H04L 5/0055* (2013.01);
(Continued)

(58) Field of Classification Search
CPC ... H04L 5/0005; H04L 5/0037; H04L 5/0053; H04L 5/0055; H04W 72/0413
USPC ..................................... 370/310–350
See application file for complete search history.

(56) References Cited

U.S. PATENT DOCUMENTS

2008/0219370 A1* 9/2008 Onggosanusi et al. ........ 375/260
2009/0041139 A1* 2/2009 Cho et al. ...................... 375/260
2011/0096658 A1* 4/2011 Yang et al. .................... 370/210
(Continued)

OTHER PUBLICATIONS

Ericsson, "Carrier aggregation in LTE-Advanced," 3GPP TSG-RAN WG1 #53bis, R1-082468, Jun. 30, 2008, 6 pages.
Panasonic, "Support of UL/DL asymmetric carrier aggregation," 3GPP TSG RAN WG1 Meeting #54, R1-082999, Aug. 18, 2008, 3 pages.
3GPP TR 25.912 V7.1.0, Sep. 2006, "Feasibility study for evolved Universal Terrestrial Radio Access (UTRA) and Universal Terrestrial Radio Access Network (UTRAN)," 57 pages.
(Continued)

*Primary Examiner* — Habte Mered
(74) *Attorney, Agent, or Firm* — Osha Liang LLP

(57) ABSTRACT

A mobile terminal apparatus and radio base station apparatus supporting each of a plurality of mobile communication systems when the plurality of mobile communication systems coexists is disclosed, wherein the mobile terminal apparatus is a mobile terminal apparatus in a radio communication system for performing transmission and reception in uplink and downlink, each assigned to a relatively wide system band obtained by aggregating a plurality of component carriers, each of which is a relatively narrow system band, and has coding and data modulation sections that perform coding and data modulation on uplink control signals including report information of individual component carriers assigned to downlink, and mapping sections that map the control signals subjected to coding and data modulation to uplink communication channels.

4 Claims, 8 Drawing Sheets

(52) U.S. Cl.
CPC ......... *H04L 5/0057* (2013.01); *H04W 72/0413* (2013.01); *H04W 72/085* (2013.01)

(56) References Cited

U.S. PATENT DOCUMENTS

| | | | |
|---|---|---|---|
| 2011/0128942 A1* | 6/2011 | Kim et al. | 370/336 |
| 2011/0134747 A1* | 6/2011 | Kwon et al. | 370/208 |
| 2011/0142075 A1* | 6/2011 | Che et al. | 370/476 |
| 2011/0171966 A1* | 7/2011 | Parkvall et al. | 455/450 |
| 2011/0194514 A1* | 8/2011 | Lee et al. | 370/329 |

OTHER PUBLICATIONS

International Search Report issued in PCT/JP2009/066340, mailed on Dec. 28, 2009, 1 page.

Office Action issued in Japanese Patent Application No. 2008-242848, mailing date Jul. 31, 2012, and English translation thereof (4 pages).

3GPP TSG RAN1 #51; R1-074964; "UL Control Details for TDD," Qualcomm Europe; Jeju, Korea; Nov. 5-9, 2007 (7 pages).

* cited by examiner

MOBILE TERMINAL APPARATUS AND RADIO BASE STATION APPARATUS WHEN CARRIER AGGREGATION AGGREGATING MULTIPLE COMPONENT CARRIERS IS PERFORMED

TECHNICAL FIELD

The present invention relates to a mobile terminal apparatus and radio base station apparatus in next-generation mobile communication systems.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been discussed (Non-patent Document 1). In LTE, as a multiplex system, OFDMA (Orthogonal Frequency Division Multiple Access) different from W-CDMA is used in downlink, and SC-FDMA (Single Carrier Frequency Division Multiple Access) is used in uplink.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been discussed (for example, LTE Advancement (LTE-A)). Accordingly, in the future, it is expected that a plurality of these mobile communication systems will coexist, and configurations (radio base station apparatus, mobile terminal apparatus, etc.) capable of supporting a plurality of these systems are considered necessary.

CITATION LIST

Non-Patent Literature

[Non-patent Document 1]
3GPP, TR25. 912 (V7.1.0), "Feasibility study for Evolved UTRA and UTRAN", September 2006

SUMMARY OF INVENTION

Technical Problem

The present invention was made in view of the respect, and it is an object of the invention to provide a mobile terminal apparatus and radio base station apparatus supporting each of a plurality of mobile communication systems when the plurality of mobile communication systems coexists.

Solution to Problem

A mobile terminal apparatus of the invention is a mobile terminal apparatus in a radio communication system for performing transmission and reception in uplink and downlink each assigned to a relatively wide system band obtained by aggregating a plurality of component carriers each of which is a relatively narrow system band, and is characterized by having coding and data modulation means for performing coding and data modulation on an uplink control signal including report information of each component carrier assigned to downlink, and mapping means for mapping the control signal subjected to coding and data modulation to an uplink communication channel.

A radio base station apparatus of the invention is a radio base station apparatus in a radio communication system for performing transmission and reception in uplink and downlink each assigned to a relatively wide system band obtained by aggregating a plurality of component carriers each of which is a relatively narrow system band, and is characterized by having control signal extracting means for extracting a downlink control signal including report information of each component carrier assigned to downlink, and data demodulation and decoding means for performing data demodulation and decoding on the extracted control signal.

Technical Advantage of the Invention

In the invention, in a radio communication system for performing transmission and reception in uplink and downlink each assigned to a relatively wide system band obtained by aggregating a plurality of component carriers each of which is a relatively narrow system band, an uplink control signal including report information of each component carrier assigned to downlink is transmitted using a control channel for the relatively narrow system band, or a control channel or a common channel for the relatively wide system band, and therefore, even when a plurality of mobile communication systems coexists, it is possible to efficiently transmit the report information such as the CQI (Channel Quality Indicator) and ACK/NACK corresponding to each of the mobile communication systems.

DESCRIPTION OF EMBODIMENTS

Figure 1:
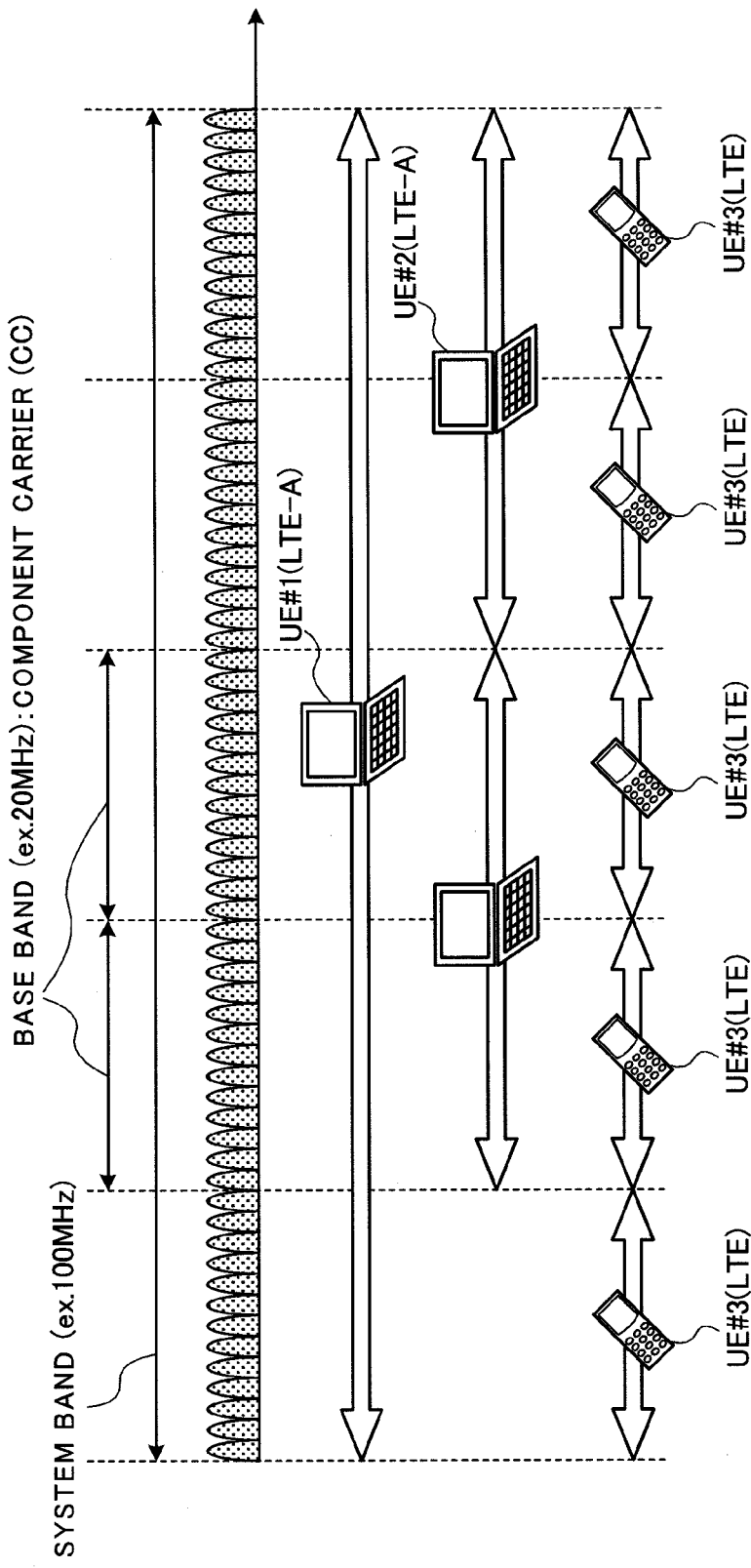
FIG. 1 is a diagram to explain system bands in the LTE system.

FIG. 1 is a diagram to explain a frequency usage state when mobile communications are performed in downlink. An example as shown in FIG. 1 indicates the frequency usage state in the case of coexistence of an LTE-A system that is a first mobile communication system having a first system band that is relatively wide, and an LTE system that is a second mobile communication system having a second system band that is relatively narrow. In the LTE-A system, for example, wireless communications are performed in a variable system bandwidth of 100 MHz or less, and in the LTE system, wireless communications are performed in a variable system bandwidth of 20 MHz or less. The system band of the LTE-A system is at least one basic frequency region (component carrier: CC) with the system band of the LTE system as a unit. Thus integrating a plurality of base frequency bands to broaden the band is referred to as Carrier Aggregation. For example, in FIG. 1, the system band of the LTE-A system is a system band (20 MHz×5=100MHz) containing bands of five component carriers with the system band (base band: 20 MHz) of the LTE system as a single component carrier. In FIG. 1, a mobile terminal apparatus UE (User Equipment) #1 is a mobile terminal apparatus supporting the LTE-A system (also supporting the LTE system) and has a system band of 100 MHz, UE#2 is a mobile terminal apparatus supporting the LTE-A system (also supporting the LTE system) and has a system band of 40 MHz (20MHz×2=40MHz), and UE#3 is a mobile terminal apparatus supporting the LTE system (not supporting the LTE-A system) and has a system band of 20 MHz (base band).

Figure 2:
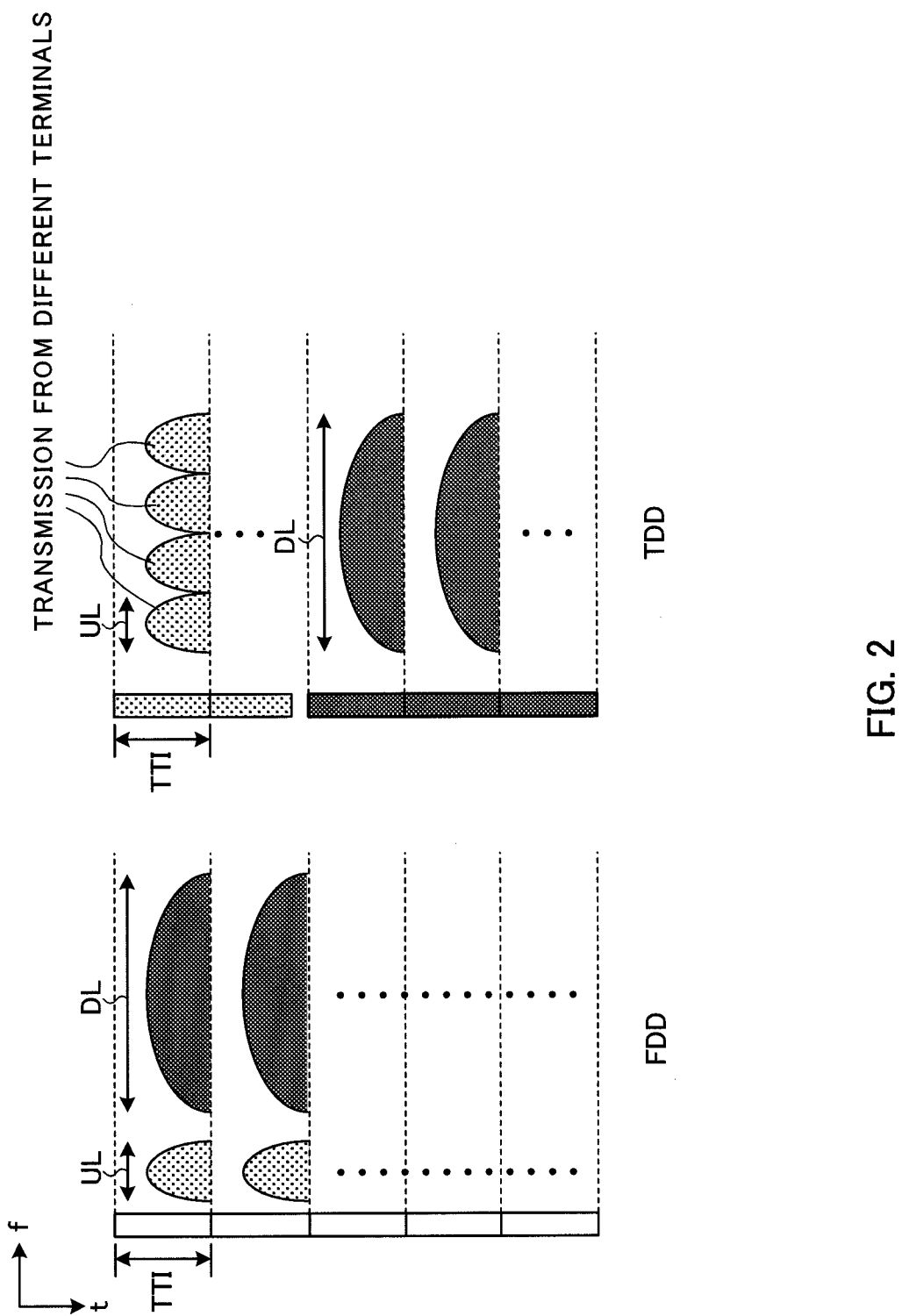
FIG. 2 is a diagram to explain asymmetry of frequency bands in downlink and uplink.

In wireless communications in thus broadened frequency band, it is expected that the frequency band assigned to downlink and the frequency band assigned to uplink are asymmetric. For example, as shown in FIG. 2, in Frequency Division Duplex (FDD), uplink (UL) and downlink (DL) have asymmetric bandwidths at a single transmission time interval (TTI). In Time Division Duplex (TDD), a plurality of uplink is assigned to the bandwidth of downlink, and uplink (UL) and downlink (DL) have asymmetric bandwidths.

The processing procedure used in the LTE system is not capable of supporting such systems in which the uplink (UL) channel and downlink (DL) have asymmetric bandwidths. Therefore, even in systems capable of using a broadened frequency band, only the basic frequency band can be supported, and it is not possible to effectively use the broadened frequency band. Therefore, under present circumstance, there is no method capable of efficiently sending report information such as the CQI (Channel Quality Indicator) and ACK/NACK.

The inventors of the invention noted the above-mentioned respect and reached the invention. In other words, it is the gist of the invention that in a radio communication system for performing transmission and reception in uplink and downlink each assigned to a relatively wide system band obtained by aggregating a plurality of component carriers each of which is a relatively narrow system band, by transmitting an uplink control signal including report information of each component carrier assigned to downlink using a control channel for the relatively narrow system band, or a control channel or a common channel for the relatively wide system band, the report information such as the CQI and ACK/NACK is transmitted efficiently corresponding to each of mobile communication systems even when a plurality of mobile communication systems coexists.

Figure 3:
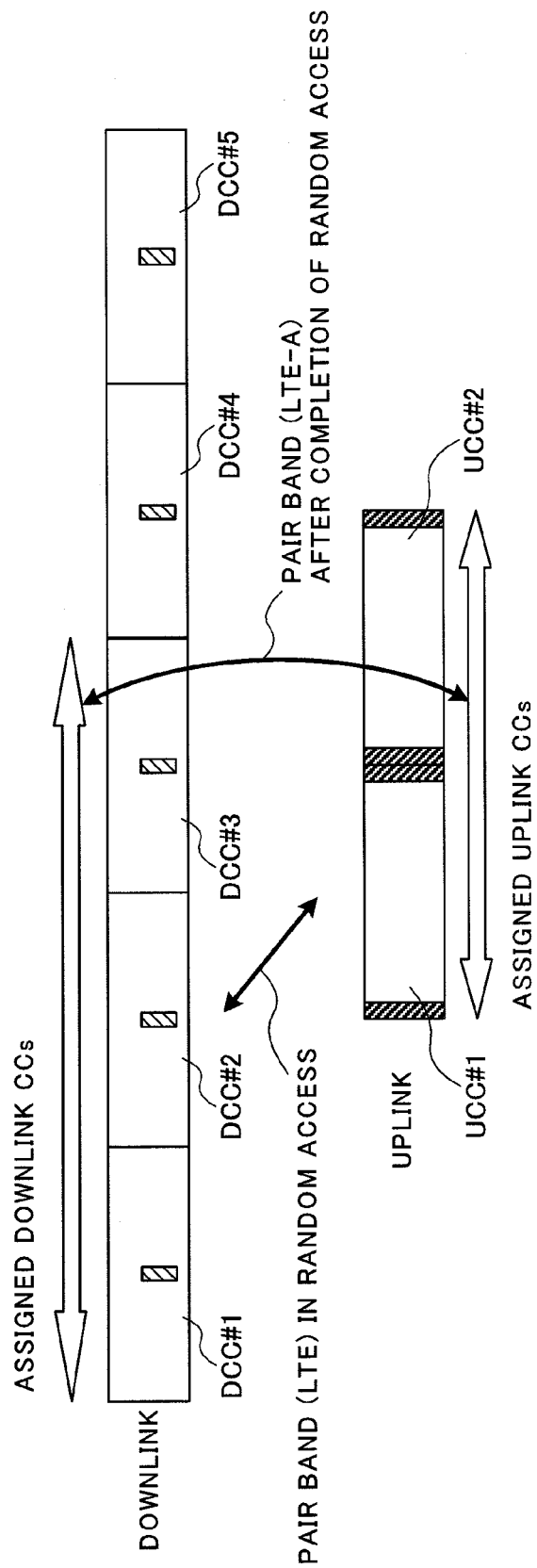
FIG. 3 is a diagram to explain pair band assignment in the LTE-A system.

An Embodiment of the invention will specifically be described below with reference to accompanying drawings. In the invention, transmission of report information is defined in a radio communication system for performing transmission and reception in uplink and downlink each assigned to a relatively wide system band (aggregated frequency bands for the LTE-A system) obtained by aggregating a plurality of component carriers each of which is a relatively narrow system band (base frequency band of the LTE system). In such a radio communication system, as shown in FIG. 3, in random access, a pair band (DCC#2-UCC#1) is determined as in the LTE system, and using the pair band, the UE capability information and pair band assignment information is transmitted and received to determine a pair band (DCC#1, DCC#2, DCC#3-UCC#1, UCC#2) assigned to the wide band. Therefore, in the case where a plurality of mobile communication systems (LTE system and LTE-A system) coexists, it is possible to support each of the mobile communication systems.

Described herein is initial access in the aforementioned radio communication system. First, a mobile terminal apparatus makes a cell search using a synchronization channel signal included in one downlink CC among a plurality of downlink CCs. At this point, the CC to connect by the cell search is assumed to be an initial downlink CC. Herein, in the example as shown in FIG. 3, downlink CC (DCC) #2 is the initial downlink CC.

The radio base station apparatus transmits a broadcast channel signal including information (bandwidth, the number of antennas, etc.) of the initial downlink CC, and the mobile terminal apparatus receives the broadcast channel signal. Further, the radio base station apparatus transmits a broadcast information signal (DBCH signal) on the DBCH (Dynamic Broadcast Channel) including information (bandwidth, center frequency, etc.) of the uplink CC paired with the initial downlink CC, and the mobile terminal apparatus receives the broadcast information signal. Herein, as shown in FIG. 3, the uplink CC paired with the DCC #2 is UCC #1.

At this point, using the information (bandwidth and the number of antennas) of the initial downlink CC of the received broadcast channel signal, the mobile terminal apparatus enables the bandwidth of a downlink reception signal to be extracted, while controlling the center frequency in downlink reception. Further, using the information (bandwidth and the number of antennas) of the uplink CC paired with the initial downlink CC of the received broadcast information signal, the mobile terminal apparatus limits the bandwidth of an uplink transmission signal, while controlling the center frequency in uplink transmission. By this means, the pair band of the initial downlink CC (DCC#2) and uplink CC (UCC#1) is determined (pair band in LTE).

Further, the radio base station apparatus transmits a broadcast information signal (DBCH signal) including an RACH parameter enabling whether the mobile terminal apparatus is an LTE-A terminal to be identified, and the mobile terminal apparatus receives the broadcast information signal. The mobile terminal apparatus generates an RACH signal based on the received RACH parameter, and transmits the RACH signal to the radio base station apparatus on the uplink CC (UCC#1) (random access).

Upon receiving the RACH signal, the radio base station apparatus transmits an RACH response signal to the mobile terminal apparatus on the initial downlink CC (DCC#2). After receiving the RACH response signal, the mobile terminal apparatus generates an uplink shared channel signal, and transmits the uplink shared channel signal to the radio base station apparatus on the PUSCH (Physical Uplink Shared Channel) of the uplink CC (UCC#1). At this point, the uplink shared channel includes the information (UE capability information) of the transmission/reception bandwidth of the mobile terminal apparatus, and the radio base station apparatus is notified of the UE capability information.

Thus, the mobile terminal apparatus transmits the uplink shared channel signal including the UE capability information (information of the transmission/reception bandwidth of the mobile terminal apparatus) to the radio base station apparatus on the uplink CC (UCC#1). Upon receiving the uplink shared channel signal, the radio base station apparatus assigns a pair band of uplink and downlink CCs based on the UE capability information (herein, the bandwidth (40 MHz) corresponding to two CCs). Herein, as shown in FIG. 3, the uplink is of UCC#1 and UCC#2, and the downlink is of DCC#1, DCC#2, and DCC#3. Further, the radio base station apparatus transmits a control signal (MAC/RRC control signal) to the mobile terminal apparatus on the PDSCH (Physical Downlink Shared Channel) on the downlink CC (DCC#2). At this point, the control signal (MAC/RRC control signal) includes the pair band assignment information, and the mobile terminal apparatus is notified of the pair band assignment information.

Next, upon receiving the control signal including the pair band assignment information, in the mobile terminal apparatus, the transmission/reception processing section adjusts (shifts) the frequency based on the pair band assignment information. More specifically, the mobile terminal apparatus adjusts to the center frequency of the bandwidth (aggregated CCs) of the downlink CCs (DCC#1, DCC#2, DCC#3), and extracts a downlink reception signal in the bandwidth of the downlink CCs (DCC#1, DCC#2, DCC#3). Further, the mobile terminal apparatus adjusts to the center frequency of the bandwidth (aggregated CCs) of the uplink CCs (UCC#1, UCC#2), and limits an uplink transmission signal to the bandwidth of the uplink CCs (UCC#1, UCC#2). By this means, the mobile terminal apparatus is capable of communicating with the radio base station apparatus using the frequency band with the assigned wide band. Subsequently, the mobile terminal apparatus receives downlink control information (layer1/layer2 control signal), checks the user ID, and decodes radio resource assignment information corresponding to the user ID (blind decoding). Then, the mobile terminal apparatus transmits and receives the shared data channel.

Herein, described is a method of transmitting an uplink control signal including report information of each component carrier assigned to downlink in the above-mentioned radio communication system, using a control channel for the relatively narrow system band (LTE system band) or a control channel or common channel for the relatively wide system band (LTE-A system band).

Figure 4:
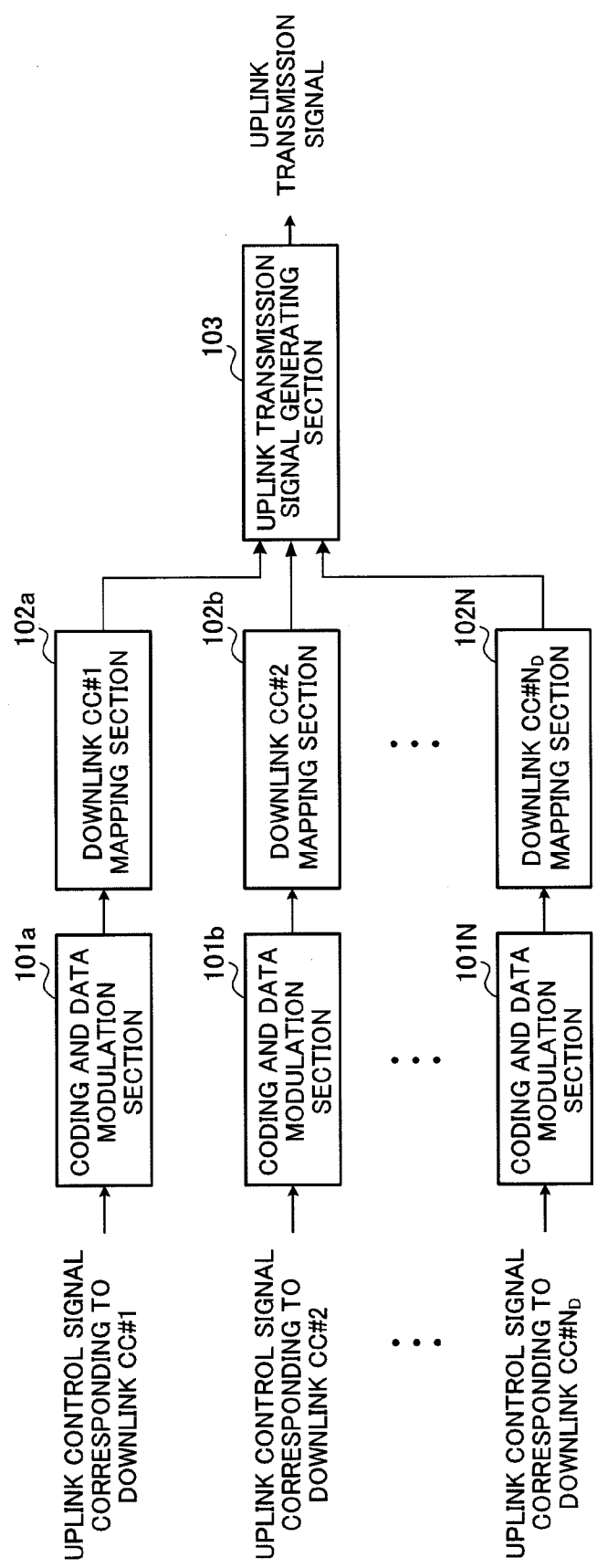
FIG. 4 is a diagram illustrating a configuration of part of a mobile terminal apparatus according to an Embodiment of the invention.
Figure 5:
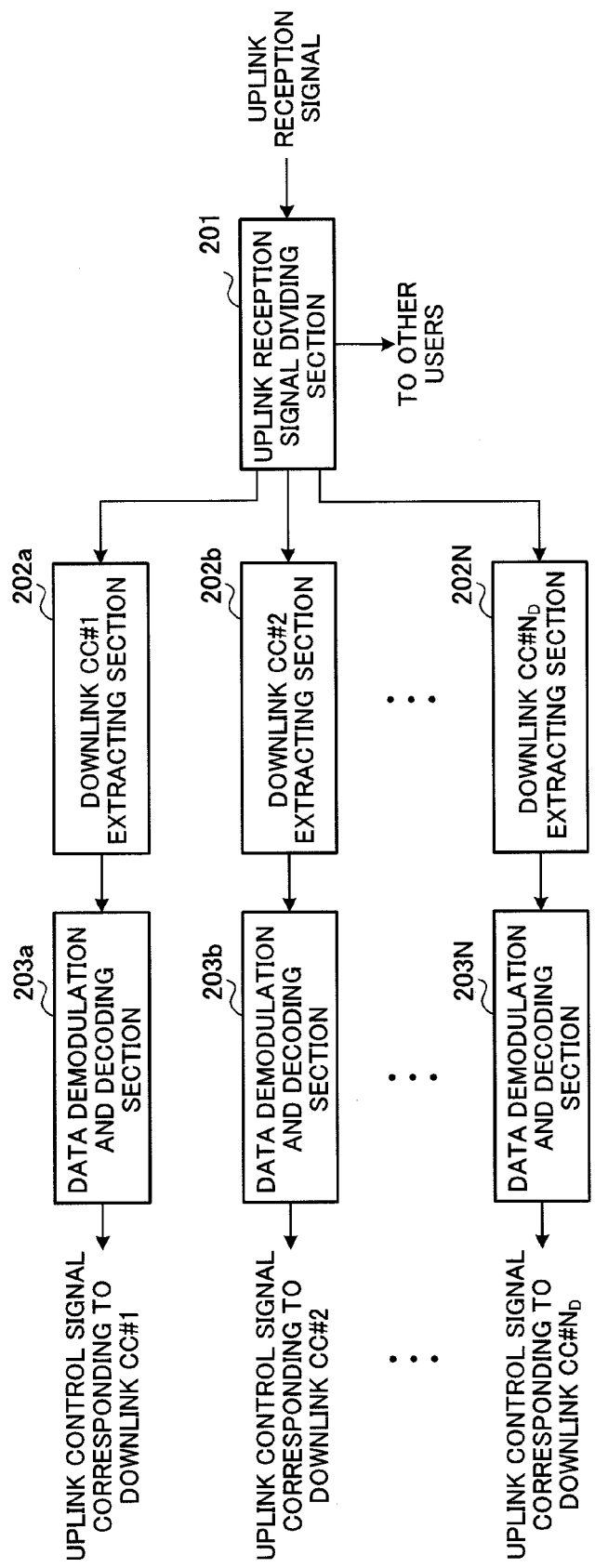
FIG. 5 is a diagram illustrating a configuration of part of a radio base station apparatus according to the Embodiment of the invention.

FIG. 4 is a diagram illustrating a configuration of part of the mobile terminal apparatus (LTE-A terminal) according to the Embodiment of the invention. Further, FIG. 5 is a diagram illustrating a configuration of part of the radio base station apparatus according to the Embodiment of the invention. The mobile terminal apparatus as shown in FIG. 4 transmits the report information of each component carrier (CC) assigned to downlink independently on each CC using the PUCCH (Physical Uplink Control Channel) that is a communication channel of the LTE system. In addition, transmission of the report information in the LTE terminal is the same as in the normal case, and descriptions thereof are omitted.

The mobile terminal apparatus as shown in FIG. 4 has coding and data modulation sections 101a to 101N that perform coding and data modulation on uplink control signals corresponding to the downlink CCs for each CC, downlink CC mapping sections 102a to 102N that map the uplink control signals subjected to coding and data modulation in the coding and data modulation sections 101a to 101N to uplink PUCCHs corresponding to the downlink CCs, respectively, and an uplink transmission signal generating section 103 that generates an uplink transmission signal of the PUCCHs subjected to mapping. The uplink control signal includes the report information (CQI and ACK/NACK) of individual CCs assigned to downlink. In the mobile terminal apparatus having such a configuration, the coding and data modulation sections 101a to 101N are provided for each CC assigned to downlink, and the downlink CC mapping sections map the uplink control signals to respective uplink control channels (PUCCHs) for the LTE system corresponding to each CC. In other words, this mobile terminal apparatus performs coding and data modulation on uplink control signals respectively corresponding to downlink CCs independently to transmit independently.

The radio base station apparatus as shown in FIG. 5 has an uplink reception signal dividing section 201 that divides an uplink reception signal of the mobile terminal apparatus under communications from an uplink reception signal, downlink CC extracting sections 202a to 202N that extract uplink PUCCHs corresponding to downlink CCs from the divided uplink reception signal for each CC, and data demodulation and decoding sections 203a to 203N that perform data demodulation and decoding on uplink control signals of the extracted PUCCHs for each CC. The uplink control signals include the report information (CQI and ACK/NACK) of individual CCs assigned to downlink. In the radio base station apparatus having such a configuration, the downlink CC extracting sections 202a to 202N and data demodulation and decoding sections 203a to 203N are provided for each CC for the LTE system band assigned to downlink. In other words, the radio base station apparatus receives uplink control signals respectively corresponding to downlink CCs independently to perform data demodulation and decoding independently.

The mobile terminal apparatus (LTE-A terminal) as shown in FIG. 4 performs coding and data modulation on the uplink control signals respectively corresponding to downlink CCs independently to transmit independently, and by this means, in the broadened frequency band (LTE-A system band), is capable of efficiently transmitting the uplink control signals including the report information (CQI and ACK/NACK) of individual CCs assigned to downlink. Therefore, even when a plurality of mobile communication systems coexists, it is possible to efficiently transmit the report information such as the CQI and ACK/NACK corresponding to each of the mobile communication systems.

Figure 6:
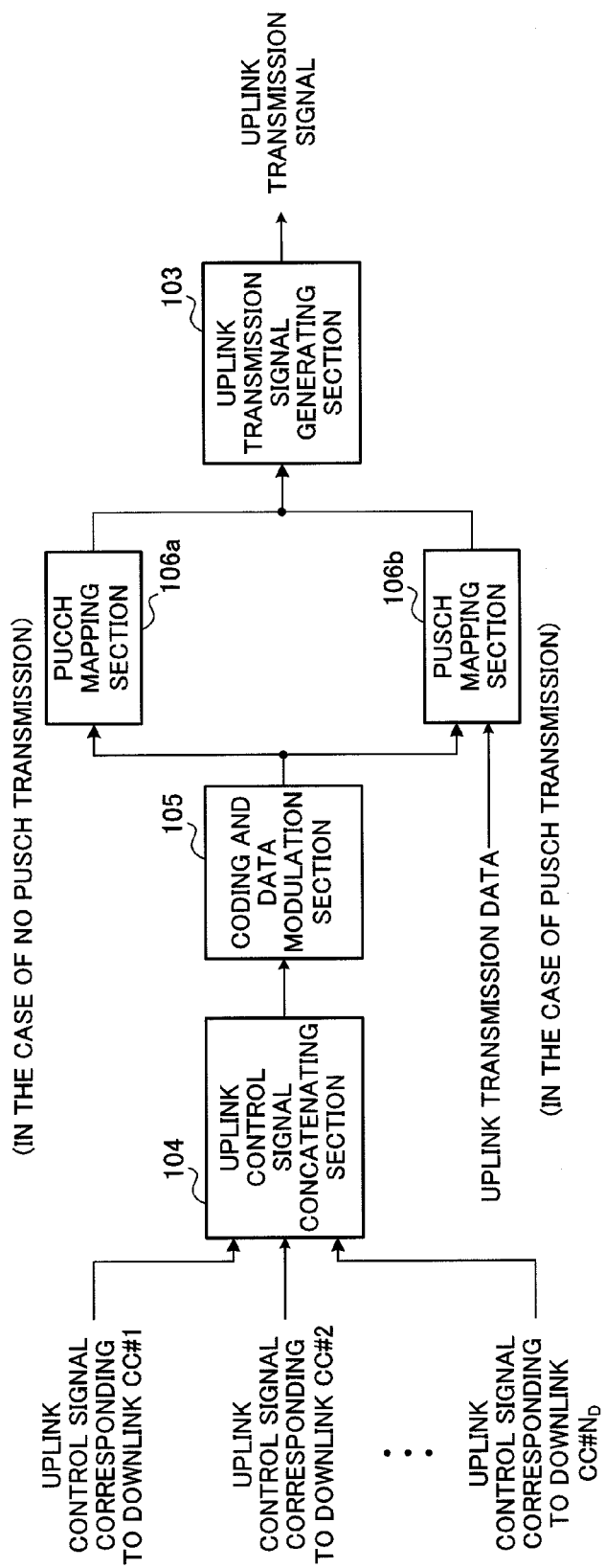
FIG. 6 is a diagram illustrating a configuration of part of the mobile terminal apparatus according to the Embodiment of the invention.
Figure 7:
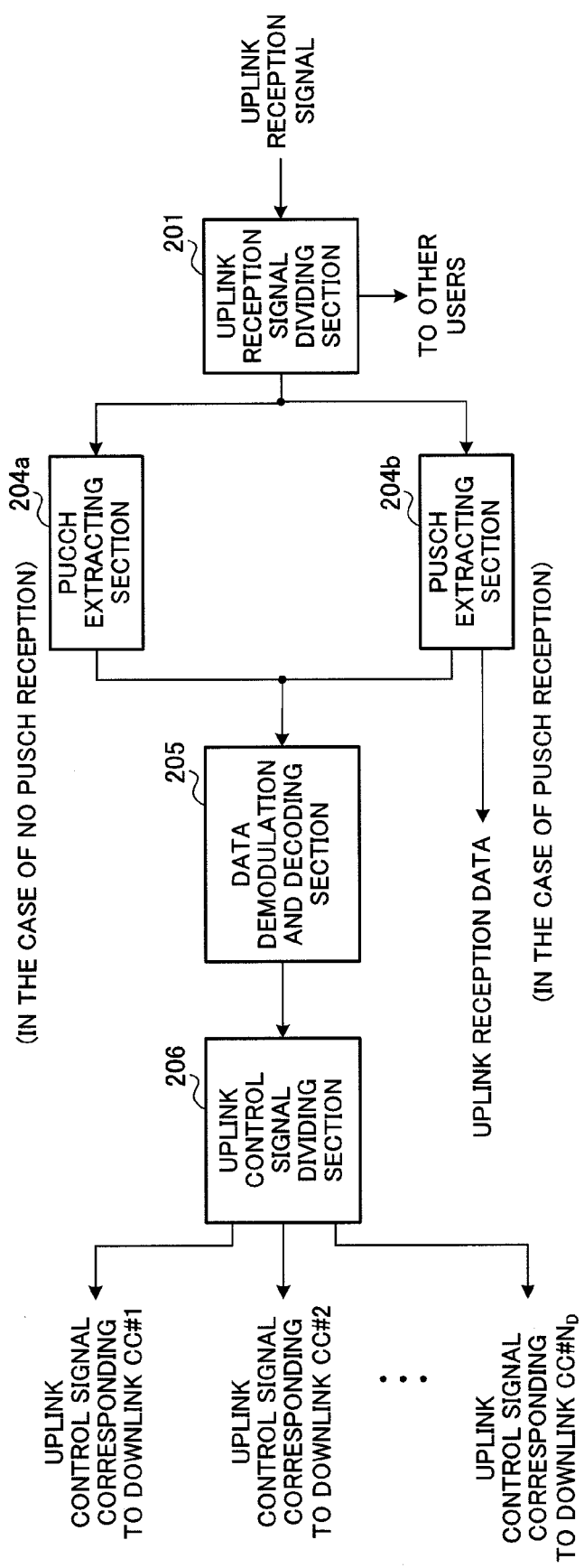
FIG. 7 is a diagram illustrating a configuration of part of the radio base station apparatus according to the Embodiment of the invention.

FIG. 6 is a diagram illustrating a configuration of part of the mobile terminal apparatus (LTE-A terminal) according to the Embodiment of the invention. In FIG. 6, the same components as in FIG. 4 are assigned the same reference numerals, and specific descriptions thereof are omitted. Further, FIG. 7 is a diagram illustrating a configuration of part of the radio base station apparatus according to the Embodiment of the invention. In FIG. 7, the same components as in FIG. 5 are assigned the same reference numerals, and specific descriptions thereof are omitted.

The mobile terminal apparatus as shown in FIG. 6 has an uplink control signal concatenating section 104 that concatenates uplink control signals corresponding to downlink CCs, a coding and data modulation section 105 that performs coding and data modulation on the concatenated uplink control signal (the uplink control signals of the aggregated CCs), a PUCCH mapping section 106a that maps the uplink control signal subjected to coding and data modulation in the coding and data modulation section 105 to the PUCCH assigned in the LTE-A format, a PUSCH mapping section 106b that maps the uplink control signal subjected to coding and data modulation in the coding and data modulation section 105 to the PUSCH assigned in the LTE-A format together with uplink transmission data, and the uplink transmission signal generating, section 103 that generates a mapped uplink transmission signal of the PUCCH or a mapped uplink transmission signal of the PUSCH.

The mobile terminal apparatus as shown in FIG. 6 concatenates control signals including the report information of individual CCs assigned to downlink as aggregated CCs, and transmits the uplink control signal using the PUCCH (control channel) or PUSCH (Physical Uplink Shared Channel) that is a communication channel in the LTE-A system corresponding to the aggregated CCs. In the mobile terminal apparatus as shown in FIG. 6, when there is no PUSCH transmission, the uplink control signal is transmitted on the PUCCH. Meanwhile, when there is PUSCH transmission, the uplink control signal is transmitted on the PUSCH. The uplink control signal includes the report information obtained by concatenating the report information (CQI and ACK/NACK) of individual CCs assigned to downlink. In this mobile terminal apparatus, uplink control signals corresponding to respective downlink CCs are concatenated, subjected to joint coding and data modulation, and then, transmitted. In addition, also in this case, transmission of the report information in the LTE terminal is the same as in the normal case, and descriptions thereof are omitted.

Figure 8:
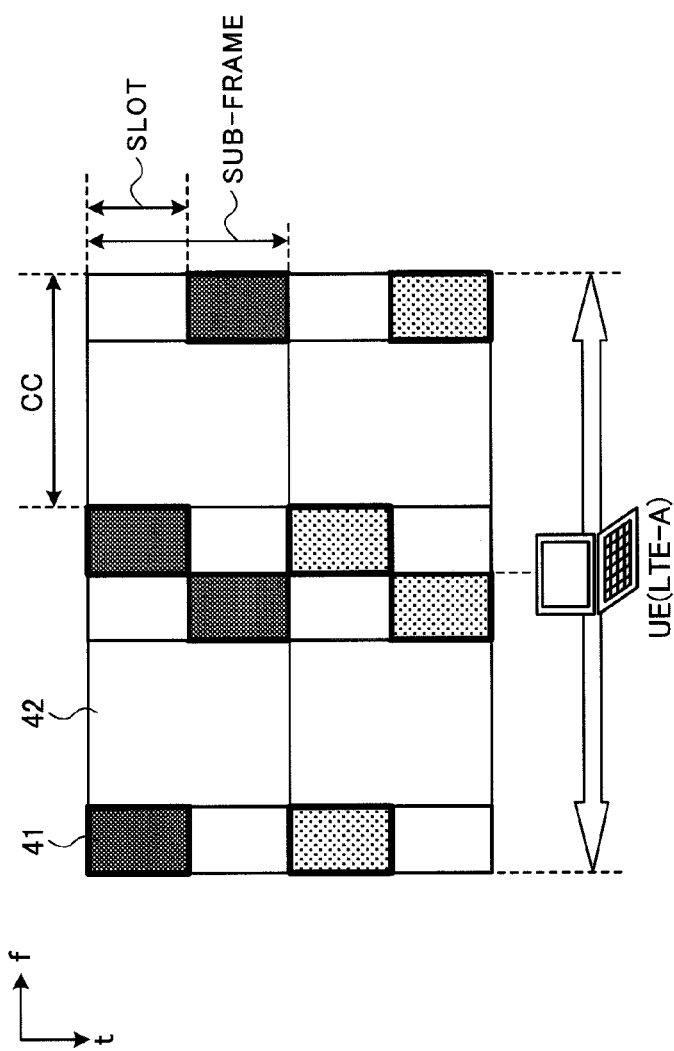
FIG. 8 is a diagram showing an example of format of an uplink transmission signal in the LTE-A system.

In the LTE-A system, an uplink transmission signal is transmitted in the format as shown in FIG. 8. In such a format, it is possible to perform transmission more than in the format in the LTE system, and it is thereby possible to efficiently transmit the uplink control signal including the report information by the above-mentioned method. In FIG. 6, when an uplink control signal is mapped to the PUCCH of the LTE-A system, the uplink control signal is transmitted on a control channel 41 as shown in FIG. 8. Meanwhile, when an uplink control signal is mapped to the PUSCH of the LTE-A system, the uplink control signal is transmitted on a shared channel 42 as shown in FIG. 8.

The radio base station apparatus as shown in FIG. 7 has an uplink reception signal dividing section 201 that divides an uplink reception signal of the mobile terminal apparatus under communications from an uplink reception signal, a PUCCH extracting section 204a that extracts the uplink PUCCH corresponding to the downlink CC from the divided uplink reception signal, a PUSCH extracting section 204b that extracts the uplink PUSCH corresponding to the downlink CC from the divided uplink reception signal, a data demodulation and decoding section 205 that performs data demodulation and decoding on an uplink control signal of the extracted PUCCH or an uplink control signal of the extracted PUSCH, and an uplink control signal dividing section 206 that divides the control signal subjected to data demodulation and decoding for each downlink CC. In the radio base station apparatus having such a configuration, the PUCCH extracting section 204a or PUSCH extracting section 204b extracts the uplink control signal including the entire report information of the aggregated CCs for the LTE-A system band, and the uplink control signal is subjected to data demodulation and decoding, and then, divided for each downlink CC.

By extracting an uplink control signal including the entire report information of the aggregated CCs for the LTE-A system band, and performing data demodulation and decoding on the uplink control signal, the mobile terminal apparatus (LTE-A terminal) as shown in FIG. 6 is capable of efficiently transmitting the uplink control signal including the report information (CQI and ACK/NACK) of individual CCs assigned to downlink in the broadened frequency band (LTE-A system band). Therefore, even when a plurality of mobile communication systems coexists, it is possible to efficiently transmit the report information such as the CQI and ACK/NACK corresponding to each of the mobile communication systems. Further, as described above, the mobile terminal apparatus performs joint coding to transmit the report information of individual CCs, and it is thereby possible to improve the error rate in the radio base station apparatus.

The present invention is not limited to the above-mentioned Embodiment, and is capable of being carried into practice with various modifications thereof. The above-mentioned Embodiment describes the case where the report information is the CQI and ACK/NACK, but the invention is not limited thereto, and the report information is not particularly limited as long as the report information is information reported in uplink. For example, without departing from the scope of the invention, the assignment of component carriers, the number of processing sections, processing procedures, the number of component carriers, and the aggregate number of component carriers in the above-mentioned descriptions are capable of being carried into practice with modifications thereof as appropriate. Further, the invention is capable of being carried into practice with modifications thereof as appropriate without departing from the scope of the invention.

The invention claimed is:

1. A mobile terminal apparatus in a radio communication system using a relatively wide system band obtained by aggregating a plurality of component carriers each of which is a relatively narrow system band, comprising:
   an uplink signal generating section for transmitting uplink control signals;
   a coding and data modulation section configured to concatenate the uplink control signals each of which includes ACK/NACK information of each component carrier assigned to downlink to perform coding and data modulation on a concatenated uplink control signal; and
   a PUCCH mapping section configured to map the concatenated uplink control signal subjected to coding and data modulation to an uplink control channel (PUCCH) assigned in a Long Term Evolution Advancement (LTE-A) format supporting the plurality of component carriers; and
   a PUSCH mapping section configured to map the concatenated uplink control signal subjected to coding and data modulation to an uplink shared channel (PUSCH),
   wherein the concatenated uplink control signal is transmitted either on the PUCCH or on the PUSCH, and when there is no PUSCH transmission, the concatenated uplink control signal is transmitted on the PUCCH.

2. A radio base station apparatus in a radio communication system using a relatively wide system band obtained by aggregating a plurality of component carriers each of which is a relatively narrow system band, comprising:
   an uplink reception signal dividing section for receiving a concatenated uplink control signal;
   a PUCCH control signal extracting section configured to extract the concatenated uplink control signal including ACKJNACK information of each component carrier assigned to downlink, from an uplink control channel (PUCCH) assigned in a Long Term Evolution Advancement (LTE-A) format supporting the plurality of component carriers;
   a PUSCH control signal extracting section configured to extract the concatenated uplink control signal from an uplink shared channel (PUSCH); and
   a data demodulation and decoding section configured to perform data demodulation and decoding on the concatenated uplink control signal, wherein the concatenated uplink control signal is transmitted either on the PUCCH or on the PUSCH.

3. A mobile communication system using a relatively wide system band obtained by aggregating a plurality of component carriers each of which is a relatively narrow system band, comprising:
- a mobile terminal apparatus which comprises:
- an uplink signal generating section for transmitting uplink control signals;
- a coding and data modulation section configured to concatenate the uplink control signals each of which includes ACK/NACK information of each component carrier assigned to downlink to perform coding and data modulation on a concatenated uplink control signal;
- a PUCCH mapping section configured to map the concatenated uplink control signal subjected to coding and data modulation to an uplink control channel (PUCCH) assigned in a Long Term Evolution Advancement (LTE-A) format supporting the plurality of component carriers; and
- a PUSCH mapping section configured to map the concatenated uplink control signal subjected to coding and data modulation to an uplink shared channel (PUSCH),
- wherein the concatenated uplink control signal is transmitted either on the PUCCH or on the PUSCH, and when there is no PUSCH transmission, the concatenated uplink control signal is transmitted on the PUCCH.

4. A mobile communication method using a relatively wide system band obtained by aggregating a plurality of component carriers each of which is a relatively narrow system band, comprising the steps of:
- in a mobile terminal apparatus,
  - transmitting uplink control signals;
  - concatenating the uplink control signals each of which includes ACK/NACK information of each component carrier assigned to downlink to perform coding and data modulation on a concatenated uplink control signal;
  - mapping the concatenated uplink control signal subjected to coding and data modulation to an uplink control channel (PUCCH) assigned in a Long Term Evolution Advancement (LTE-A) format supporting the plurality of component carriers or to an uplink shared channel (PUSCH);
- wherein the concatenated uplink control signal is transmitted either on the PUCCH or on the PUSCH, and when there is no PUSCH transmission, the concatenated uplink control signal is transmitted on the PUCCH.

* * * * *